United States Patent
Rostrup-Nielsen et al.

[11] Patent Number: 5,688,609
[45] Date of Patent: Nov. 18, 1997

[54] PROCESS FOR THE PRODUCTION OF ELECTRICAL ENERGY IN AN INTERNAL REFORMING HIGH TEMPERATURE FUEL CELL

[75] Inventors: Jens Rostrup-Nielsen, Virum; Lars J. Christiansen, Farum; Kim Aasberg-Petersen, Virum, all of Denmark

[73] Assignee: Haldor Topsoe A/S, Lyngby, Denmark

[21] Appl. No.: 535,750

[22] Filed: Sep. 28, 1995

[30] Foreign Application Priority Data

Sep. 29, 1994 [DK] Denmark ................. 1129/94

[51] Int. Cl.[6] .................................. H01M 8/10
[52] U.S. Cl. ............................. 429/15; 429/30
[58] Field of Search ................... 429/13, 14, 15, 429/30, 17, 19

[56] References Cited

U.S. PATENT DOCUMENTS 3,431,146  3/1969  Truitt ........................... 429/16
4,567,117  1/1986  Patel ........................... 429/19
4,925,745  5/1990  Remick ......................... 429/40

OTHER PUBLICATIONS

K. Ledjeff, et al., "Internal Reforming for Solid Oxide Fuel Cells," Proceedings from the International Symposium on Solid Oxide Fuel Cells, 2nd (1991) (month not available), 1991.

Primary Examiner—John Niebling
Assistant Examiner—Brendan Mee
Attorney, Agent, or Firm—Ostrolenk, Faber, Gerb & Soffen, LLP

[57] ABSTRACT

A process for producing electrical energy in an internal reforming, high-temperature fuel cell. Steam reforming of a carbonaceous feed gas takes place in the presence of a steam-reforming catalyst in heat-conducting relationship with electrochemical reactions in the fuel cell. The steam reformed feed gas is electrochemically reacted in an anode compartment of the fuel cell. The process is improved by controlled addition of a gaseous, sulfur-containing compound to the carbonaceous feed gas in an amount sufficient to obtain a sulfur coverage on the steam reforming catalyst of between 0.1 to 0.9.

12 Claims, 1 Drawing Sheet

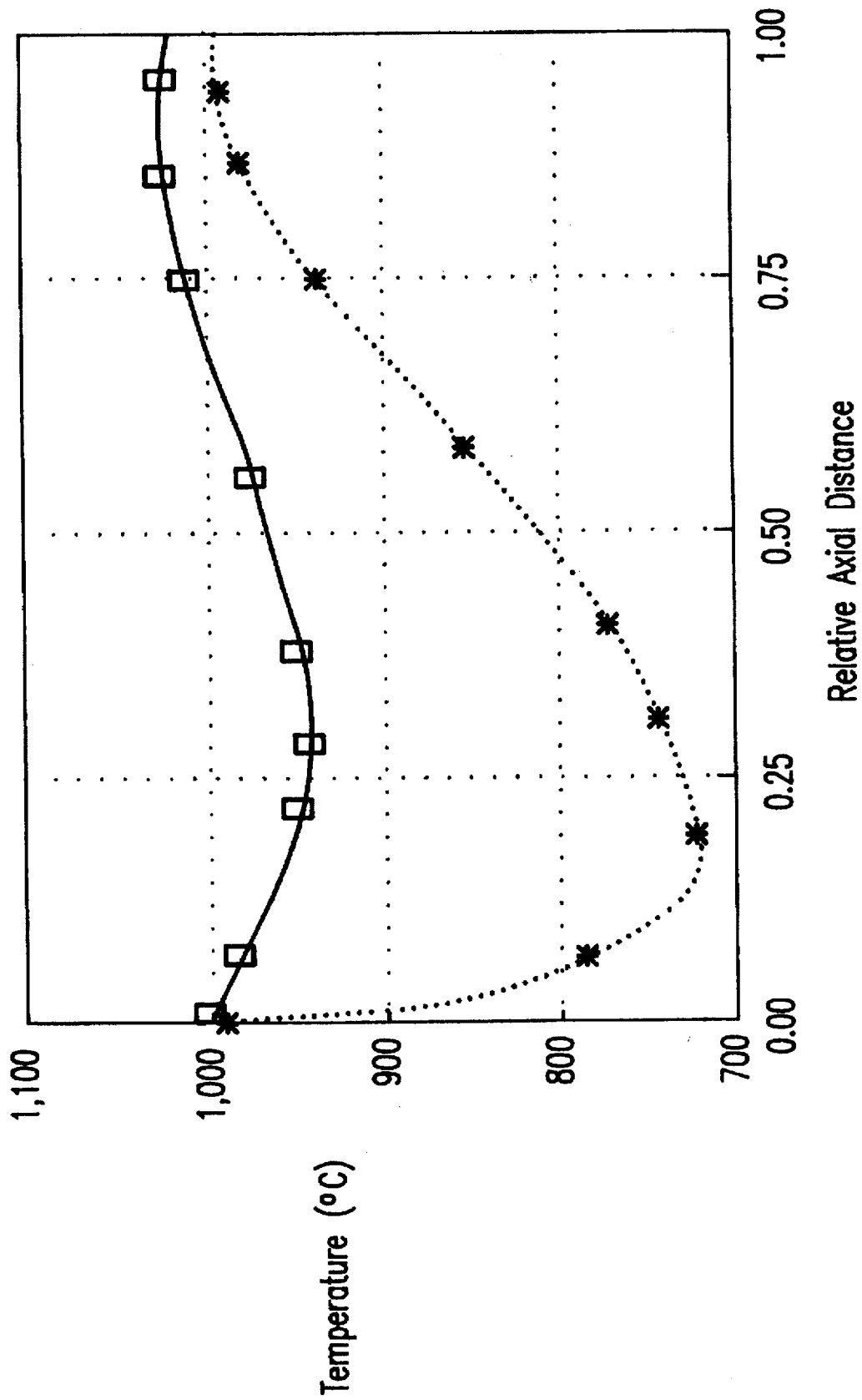

PROCESS FOR THE PRODUCTION OF ELECTRICAL ENERGY IN AN INTERNAL REFORMING HIGH TEMPERATURE FUEL CELL

BACKGROUND OF THE INVENTION

1. Field of the Invention

This invention is directed to a method of producing electrical energy in a high temperature fuel cell, and more particularly, to improvements in the electrochemical conversion of chemical energy contained in a carbonaceous feed gas into electrical energy in high temperature fuel cells.

2. Description of the Related Art

High temperature fuel cells like the solid oxide fuel cell comprise an electrolyte sandwiched between a cathode and an anode. Oxygen reacts with electrons at the cathode to form oxygen ions, which are conducted through the ion-conducting ceramic electrolyte to the anode according to the reaction:

$$\tfrac{1}{2}O_2 + 2e^- \rightarrow O^{2-} \tag{1}$$

At the anode, oxygen ions combine with hydrogen and carbon monoxide to form water and carbon dioxide thereby liberating electrons according to the exothermic reactions:

$$H_2 + O^{2-} \rightarrow H_2O + 2e^- \tag{2}$$

$$CO + O^{2-} \rightarrow CO_2 + 2e^- \tag{3}$$

In conventionally-designed solid oxide fuel cells, the above electrochemical reactions usually are performed at temperatures of between 800° C. and 1000° C.

The high operating temperatures employed in solid oxide fuel cells permit internal reforming of carbonaceous feed gas to anode fuel gas. The feed gas is, thereby, combined with steam and/or carbon dioxide and reformed within the fuel cell by the following endothermic reactions:

$$C_nH_m + nH_2O \rightarrow n\,CO + (m/2+n)\,H_2 \tag{4}$$

$$C_nH_m + nCO_2 \rightarrow 2nCO + (m/2\,H_2) \tag{5}$$

The reforming reactions (4) and (5) may be carried out directly on the anode, which in the known solid oxide fuel cells are usually made of metallic nickel or ruthenium supported on yttria-stabilized zirconia.

In order to enhance reforming of the feed gas, the gas is contacted with a specific steam reforming catalyst including nickel and/or ruthenium, supported on refractory carrier materials arranged internally within the cell in heat conducting relationship with the electrochemical reactions in the cell. Thereby necessary heat for the above endothermic reforming reactions is supplied by excess heat from the exothermic electrochemical reactions (2) and (3).

As an advantage of such a fuel cell, the need for external heat exchange is reduced or eliminated and the efficiency of the cell and the fuel cell plant increased.

Internal reforming of carbonaceous feed within a solid oxide fuel cell is, however, problematic. As known in the art, the steam reforming reactions proceed at a very high rate at the inlet portion of the catalyst or anode resulting in strong cooling at the cell inlet or formation of cold spots in the cell.

This is detrimental to the cell performance in several ways. A decrease in the cell temperature rapidly increases the ohmic resistance of the solid cell electrolyte, leading to reduced operating cell voltage of the cell. In addition, material problems related to thermal stress arising from differential temperatures of cell components at local cold spots and high temperature gradients in regions of the inlet portion of the cell reduce the cell lifetime.

A further problem, which usually occurs during steam reforming at very high temperatures as in the solid oxide fuel cell, is cracking of hydrocarbons, which leads to severe carbon deposition on the reforming catalyst or cell anode.

SUMMARY OF THE INVENTION

We have now observed that carbonaceous feed gas is reformed internally within a solid oxide fuel cell without the above problems, if the activity for reactions (4) and (5) of the steam reforming catalyst or the cell anode is reduced by partially poisoning the catalytic material with sulfur.

Based on this observation, the invention provides an improved method of producing electrical energy in an internal reforming solid oxide fuel cell comprising catalytic steam reforming carbonaceous feed gas internal and in heat conducting relationship with electrochemical reactions in the fuel cell; and electrochemically reacting the steam reformed feed gas in an anode compartment of the fuel cell, the improvement of which consists in adding controlled amounts of a gaseous sulfur containing compound to the carbonaceous feed gas to obtain on surfaces of the cell, which are catalytically active in the steam reforming of the feed gas, a sulfur coverage of between 0.1 and 0.9 sulfur atoms per catalytic surface atom.

Through partial sulfur poisoning of the steam reforming catalytic active surface, the endothermic reforming reactions proceed at a lower rate, in particular, at the inlet portion of the cell having a high sulfur coverage, which results in a lower temperature drop in this region and a desirable smooth temperature profile in the cell.

Furthermore, the sulfur compound in the feed gas partially blocks the catalytic surface, which means that adsorbed carbon atoms formed at high temperatures by cracking of hydrocarbons in the feed gas cannot be dissolved into the catalytic surface, which eliminates carbon formation on the surface.

Data from the literature (J. Catal. 85, 31, 1984) show that at high temperatures the reforming activity of nickel, which is the usual catalytic active ingredient of the catalytic surface in the cell, decreases at a sulfur coverage of between 0.2 and 0.5 by the power of about 3, whereas the rate of carbon formation decreases by the power of about 6.

It has further been observed that the presence of sulfur in an amount of up to 69 ppm $H_2S$ in a pure hydrogen fuel gas has no significant impact on the electrode activity of the cell (B. G. Ong, D. M. Mason, Fuel Cell Seminar, Tucson, U.S.A., 1986).

It is, thus, possible to control the reforming rate internally of a solid oxide fuel cell, by adding small amounts of sulfur compounds to the feed gas, whereby excessive cooling of the cell in the inlet part due to high reforming rates is avoided.

The catalytic surface may comprise any of the metals known to be active in the steam reforming of hydrocarbons and to have affinity to sulfur. Preferred metals are nickel, ruthenium, gold, platinum or mixtures thereof, which are the usual catalytically active ingredients of the anode in a solid oxide fuel cell or of steam reforming catalysts.

As mentioned above, an advantage of the solid oxide fuel cell is the possibility to perform the steam reforming reactions directly on the anode without a specific reforming catalyst in the cell.

When using controlled amounts of sulfur compounds in the feed gas, the reforming rate on the internal reforming anode will be most reduced at the inlet of the anode, because of a low partial pressure of hydrogen in this region. As sulfur compound can be used $H_2S$ or any compound that is converted to $H_2S$ in the hydrogen containing fuel gas.

The above features and advantages of the invention will further be illustrated by means of computation models, showing the sulfur coverage profile on the nickel containing anode of a solid oxide fuel cell at different contents of sulfur in the feed gas together with the rate of the steam reforming reactions thereby obtained.

BRIEF DESCRIPTION OF THE DRAWINGS

FIG. 1 is a graph illustrating comparative temperature profiles of solid oxide fuel cells according to the present invention.

DETAILED DESCRIPTION OF THE PREFERRED EMBODIMENTS

EXAMPLE

In a first calculated experiment, the relative steam reforming reaction rate on a nickel surface in a conventional fixed bed containing nickel catalyst was calculated at different sulfur coverage rates on the nickel surface.

Sulfur coverage ($\Theta_S$) was determined by simulated hydrogen sulfide addition to a hydrocarbon containing feed gas to obtain a $p_{H2S}/p_{H2}$ between 0 and 50 ppm.

By use of the known formula $$\Theta_s = 1.45 - 9.53 \cdot 10^{-5} T(°K.) + 4.17 \cdot 10^{-5} T(°K.) \cdot \ln \frac{p_{H_2S}}{p_{H_2}}$$

the sulfur coverage on the nickel surface was calculated as summarized in Table 1 below.

The relative steam reforming rate (r) in the hydrocarbon feed gas at different sulfur coverages was calculated at an inlet temperature T of 1273° K. by use of the formula $$r=r_o(1-\Theta_s)^3$$

wherein $r_o$ is the steam reforming reaction rate at a zero sulfur concentration in the feed gas.

The relative steam reforming reaction rates at sulfur concentrations of between 0 and 50 ppm $H_2S/H_2$ are summarized in Table 1.

TABLE 1

| $p_{H2S}/p_{H2}$ (ppm) | $\Theta_s$ | $r/r_o$ |
| --- | --- | --- |
| 0 | 0 | 1.000 |
| 0.1 | 0.4731 | 0.1462 |
| 0.5 | 0.5585 | 0.0861 |
| 1 | 0.5983 | 0.0667 |
| 2 | 0.6321 | 0.0498 |
| 3 | 0.6536 | 0.0416 |
| 5 | 0.6807 | 0.0326 |
| 10 | 0.7175 | 0.0225 |
| 50 | 0.8030 | 0.0076 |

As is apparent from Table 1, small amounts of sulfur, which have, as mentioned before no adverse effect on the electrochemical reactions in the fuel cell anode chamber, caused a considerable decrease of the steam reforming activity.

In a second experiment, the temperature profile within an internal reforming solid oxide fuel cell was calculated on an inlet fuel gas having a composition of:

12 vol % $H_2$
28 vol % $CH_4$
4 vol % $CO_2$
56 vol % $H_2O$

The temperature profile calculated at a relative axial distance from 0 to 1 within an internal reforming chamber of a solid oxide fuel cell without addition of $H_2S$(*) and with addition of 3 ppm $H_2S$ (□) to the fuel gas is shown in FIG. 1.

As seen from FIG. 1, the cell temperature drops abruptly from an inlet temperature of 1000° C. to about 700° C. in the inlet region after introduction of the sulfur free fuel gas and then inclines smoothly to 1000° C. towards the anode outlet region.

When introducing the sulfur-containing fuel gas, only a slight temperature decrease from an inlet temperature of 1000° C. to a minimum temperature of approximately 950° C. is calculated for the sulfur-containing fuel gas due to a decreased reforming activity of the catalytic surface.

Although the present invention has been described in relation to particular embodiments thereof, many other variations and modifications and other uses will become apparent to those skilled in the art. Therefore, the present invention is to be limited not by the specific disclosure herein, but only by the appended claims.

We claim:

1. In a process for producing electrical energy in an internal reforming high temperature fuel cell by steam reforming, at a reforming rate, a carbonaceous feed gas in the presence of a steam-reforming catalyst in heat-conducting relationship with electrochemical reactions in the fuel cell and electrochemically reacting the steam reformed feed gas in an anode compartment of the fuel cell, the improvement comprising the steps of:

feeding a gaseous sulfur-containing compound to the carbonaceous feed gas; and controlling the amount of the gaseous sulfur-containing compound fed to the carbonaceous feed gas so as to obtain a sulfur coverage on the steam reforming catalyst and to control the reforming rate.

2. The process of claim 1, wherein the high temperature fuel cell is a solid oxide fuel cell.

3. The process of claim 1, wherein the steam reforming catalyst is arranged in indirect heat contact with the electrochemical reactions in the anode compartment of the fuel cell.

4. The process of claim 1, wherein the steam reforming catalyst is arranged directly in the anode compartment of the fuel cell.

5. The process of claim 1, wherein the steam reforming catalyst comprises nickel as its active catalytic ingredient.

6. The process of claim 1, wherein the amount of the gaseous sulfur-containing compound is controlled so as to obtain a sulfur coverage on the steam reforming catalyst of between about 0.1 and about 0.9.

7. The process of claim 1, wherein, in the step of controlling the amount of the gaseous sulfur-containing compound fed to the carbonaceous feed gas, the amount is controlled so that excessive cooling of the cell in an inlet part thereof due to high reforming rates is avoided.

8. The process of claim 1, wherein, in the step of controlling the amount of the gaseous sulfur-containing compound fed to the carbonaceous feed gas, the amount is controlled so as to cause a substantial decrease of the steam reforming activity and a minimal decrease in the electrochemical reactions in the fuel cell anode chamber.

9. The process of claim 1, wherein the fuel cell has an internal reforming chamber and a fuel gas inlet having an axis, an inlet temperature, and a cell temperature profile for an axial distance from the inlet within the internal reforming chamber, and wherein, in the step of controlling the amount of the gaseous sulfur-containing compound fed to the carbonaceous feed gas, the amount is controlled so as to cause only a slight decrease in the cell temperature profile.

10. The process of claim 9, wherein the temperature decrease is from an inlet temperature of about 1000° C. to about 950° C.

11. The process of claim 1, wherein the steam-reforming catalyst has an affinity for sulfur.

12. The process of claim 1, wherein the steam-reforming catalyst includes nickel.

* * * * *